US006405263B1

United States Patent
Conner et al.

(10) Patent No.: US 6,405,263 B1
(45) Date of Patent: Jun. 11, 2002

(54) METHOD AND APPARATUS FOR SUBCLASSING SYSTEM OBJECT MODEL CLASSES IN DYNAMIC LANGUAGES

(75) Inventors: Michael Haden Conner; Nurcan Coskun, both of Austin, TX (US); Simon Christopher Nash, Chilbolton Stockbridge; David Seager Renshaw, Winchester, both of (GB)

(73) Assignee: International Business Machines Corporation, Armonk, NY (US)

(*) Notice: Subject to any disclaimer, the term of this patent is extended or adjusted under 35 U.S.C. 154(b) by 1026 days.

(21) Appl. No.: 08/566,618

(22) Filed: Dec. 4, 1995

(51) Int. Cl.[7] ................................. G06F 9/45

(52) U.S. Cl. ..................... 709/315; 717/116

(58) Field of Search ................. 395/702, 703, 395/705; 717/108, 106, 116, 114, 120, 140; 709/315

(56) References Cited

U.S. PATENT DOCUMENTS

| | | | |
|---|---|---|---|
| 4,635,208 A | | 1/1987 | Coleby et al. |
| 4,791,550 A | | 12/1988 | Stevenson et al. |
| 4,821,211 A | | 4/1989 | Torres |
| 4,821,220 A | | 4/1989 | Duisberg |
| 4,853,843 A | | 8/1989 | Ecklund |
| 4,885,717 A | | 12/1989 | Beck et al. |
| 4,953,080 A | | 8/1990 | Dysart et al. |
| 4,989,132 A | * | 1/1991 | Mellender et al. ......... 395/702 |
| 5,093,914 A | | 3/1992 | Coplien et al. |
| 5,179,703 A | * | 1/1993 | Evans ..................... 395/705 |
| 5,583,983 A | * | 12/1996 | Schmitter ................. 395/705 |
| 5,640,550 A | * | 6/1997 | Coker .................... 395/705 |

OTHER PUBLICATIONS

Margaret Ellis & Bjourne Stroustrup, The Annotated C ++ Reference Manaual, pp. 166–168 195–197, 1990.*

IBM Technical Disclosure Bulletin, vol. 33, No. 9 Feb. 1991, Interactive Schema Diagram To Visually Represent Tables of Related Data and Meaningful Joins Between Tables.

A Device Management Framework For an Object–Oriented Operating System, Panagiotis Kougiouris, Dipl, University of Patras, 1989, Urbana, Illinois, 1991.

Considerations of Persistence and Security in Choices, an Object–Orieneted Operating System, Roy H. Campbell and Peter W. Madany, Mar. 1991, Department of Computer Science, Urbana, Illinois, p. 1–14.

View Specification and Manipulation For A Semantic Data Model, Mar. 15, 1991, Bogdan Czejdo and David W. Embley, pp. 585–612, Copyright 1991.

(List continued on next page.)

Primary Examiner—Alvin Oberley
Assistant Examiner—Sue Lao
(74) Attorney, Agent, or Firm—David A. Mims, Jr.

(57) ABSTRACT

A method and apparatus for subclassing System Object Model (SOM) class objects for a dynamic object-oriented language. A proxy class object is created using the dynamic language that points to the SOM class object. Next, a dynamic language subclass is created. This is followed by the creation of a SOM class object using the SOM interface, which causes certain SOM methods to be overridden by dynamic language redispatch stubs. The dynamic language overrides the SOM dispatch procedures and replaces the dispatcher with its own procedures. The new dispatch procedure will search for a method in the dynamic language class object method table first in response to a message, and if not found, redirects the message to the SOM environment.

18 Claims, 4 Drawing Sheets

OTHER PUBLICATIONS

Extending Semantic Object Model: Towards More Unified View of Information Objects. Jun. 19, 1990, 1991 Butterworth–Heinemann Ltd.

A Reflexive Object–Oriented Logic Language for Distributed Computering, J. Malenfant Equipe mixte Rank–Xerox France—LITP, G. Lapalme, J. Vaucher, Nov. 1990, pp. 78–81.

IBM TDB, "Link Class Hierarchy Design", Vol. 34, No. 9, Feb. 1992, pp. 166–167.

IBM TDB, Code Independent Message Framing Format, vol. 18, No. 1, Jun. 1975, pp. 211–212.

IBM TDB, "Large Character Strings For Segmented Memory Architectures", vol. 34, No. 4A, Sep. 1991, pp. 248–250.

IBM TDB, "Smalltalk/V Presentation Manager Officevision/2 Release 2 Developer's Tookit", Vol. 34, No. 6, Nov. 1991, pp. 397–400.

IBM TDB, "Method To Intercept Dynamically Loaded Subroutine Calls On The IBM RISC System/6000 AIX Operating System", vol. 34, No. 10A, Mar. 1992, pp. 382–387.

* cited by examiner

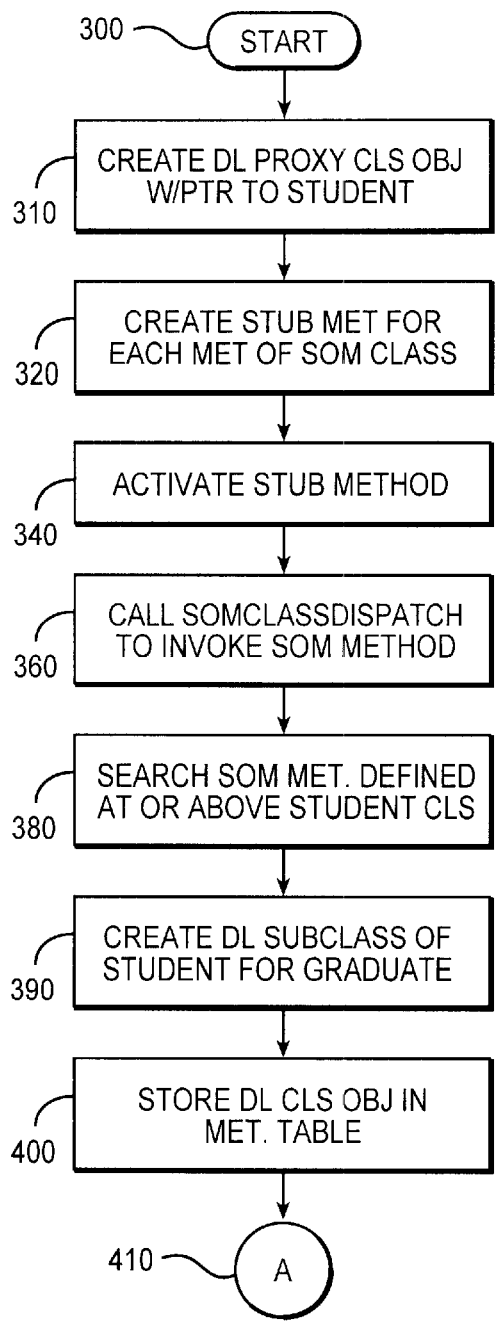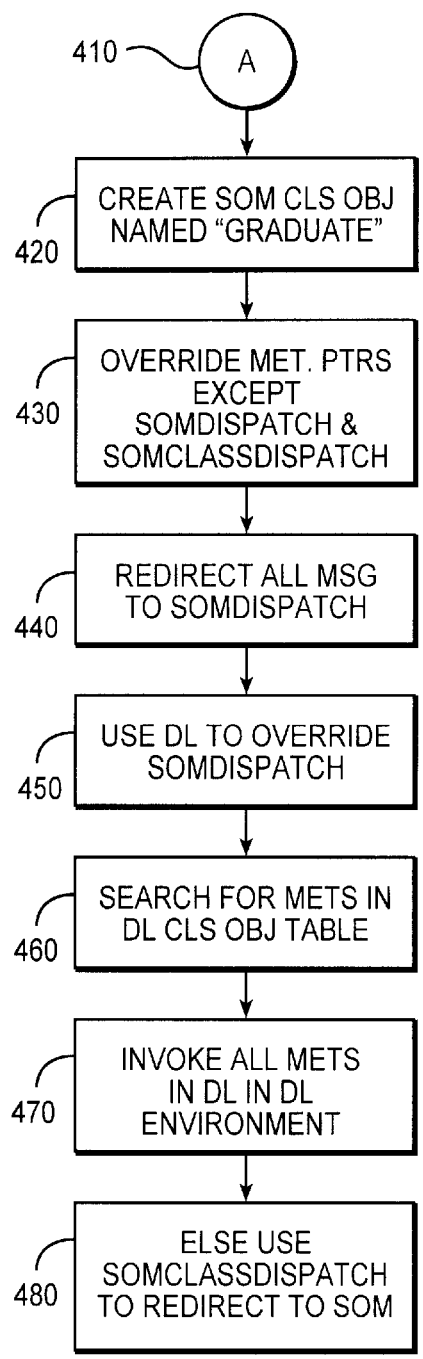
FIG. 3
FIG. 4

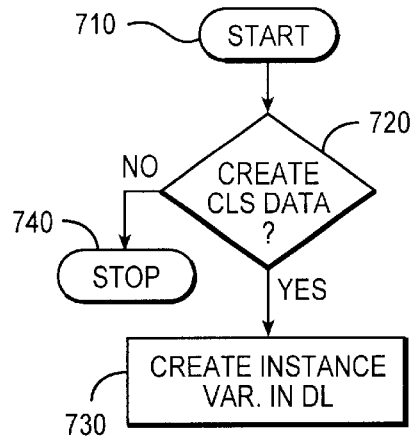
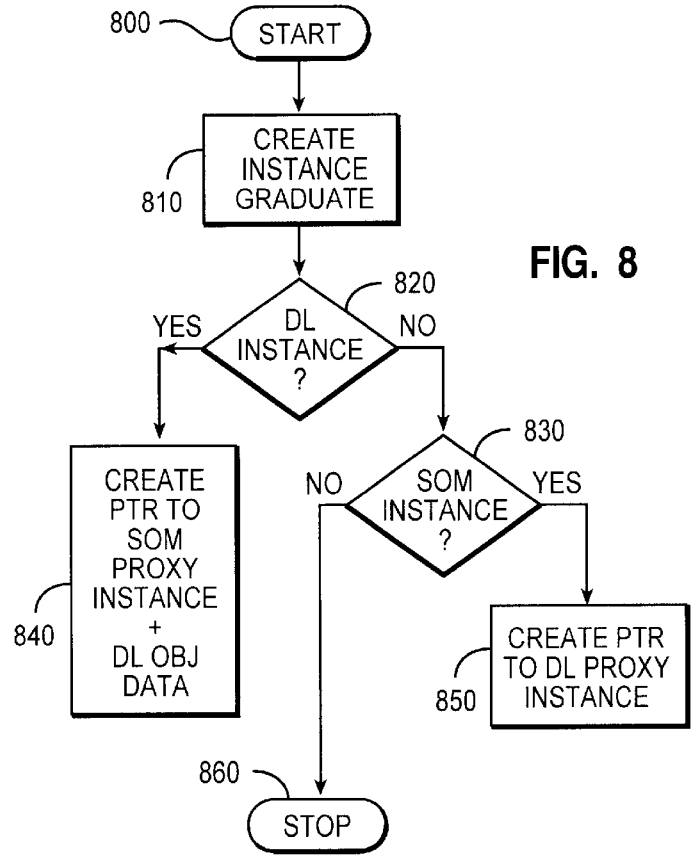
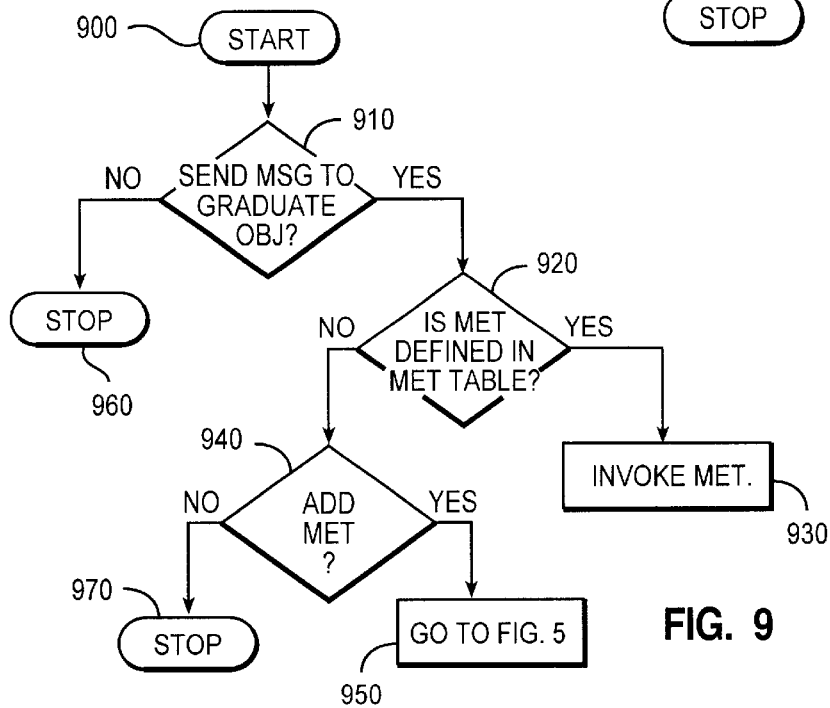

METHOD AND APPARATUS FOR SUBCLASSING SYSTEM OBJECT MODEL CLASSES IN DYNAMIC LANGUAGES

FIELD OF THE INVENTION

The present invention relates to data processing systems, and more particularly, to subclassing objects across dynamic language boundaries using a System Object Model (SOM).

BACKGROUND OF THE INVENTION

After years of debate and discussion, object-oriented programming languages (or OOP) are becoming mainstream programming technologies. The OOP languages offer improved programmer productivity, reusable code and easier maintenance. The IBM System Object Model (SOM) product, which is manufactured by the IBM Corporation, is a language neutral object-oriented object model that can be used to create user toolkits (System Object Model is a trademark of the IBM Corporation). An important requirement for such a user toolkit is the ability to subclass objects included in the toolkit. An object, as used in this invention, has the properties of encapsulation, inheritance, and polymorphism. Encapsulation refers to the hiding of an object's implementation details. Inheritance refers to a technique of specifying the shape and behavior of a class of objects, called a derived class, or a subclass, as incremental differences from another class, called a parent class or superclass. Polymorphism refers to the ability to hide different implementations behind a common interface, simplifying the communications among the objects. The subclassing of objects provides a mechanism to create completely new application objects that can cooperate with the objects in the toolkit. This allows the objects to be used in an application builder that can be offered with the toolkit. Early object-oriented object models allowed subclassing only for static languages such as C/C++. However, recent efforts have concentrated on providing subclassing for dynamic object-oriented languages such as Smalltalk, REXX and Common LISP (CLOS).

One method discloses: a procedure for permitting classes written in a dynamic language to be exported to SOM. The procedure consists of writing a class definition file that describes the interfaces of the dynamic language methods. The class definition file contains all the prototypes for the dynamic language method. Next, a class implementation file is created containing method bodies, which are special stubs that pass control to a dynamic language method dispatcher. A class object is passed as a parameter to the dynamic language method dispatcher which starts method lookup for the class. A SOM compiler processes the class definition file and creates an include file. Instances and send messages are created using the class object. Subclassing is accomplished using the include files generated by the SOM compiler.

Another procedure discloses a dynamic language that creates a SOM proxy object to represent real SOM objects. The proxy object has an instance variable which points to the real SOM object, and is used by the dynamic language to send messages to the SOM objects. The concept relies upon the implementation of a generic method by the dynamic language which allows "unknown" methods, that are called when the object receives a message that is not recognized by the dynamic language. Since SOM messages are foreign to the dynamic language, the "unknown" methods enables redirection of messages to the SOM objects.

Therefore, it is desirable to have a mechanism that provides subclassing of objects in a System Object Model toolkit for an object-oriented dynamic language.

SUMMARY OF THE INVENTION

This invention relates to a method and apparatus for subclassing System Object Model (SOM) objects for a dynamic object-oriented language. Subclassing permits a user to change the default behavior of the objects using the dynamic language. A proxy class object is created using the dynamic language that points to the SOM class object. The proxy class object contains a stub method for each of the SOM classes. Activation of the stub method causes the corresponding SOM method to be invoked. Next, a dynamic language subclass is created. This is followed by the creation of a SOM class object using the SOM interface "somCreateDynamicClass", which causes certain SOM methods to be overridden by dynamic language redispatch stubs. The dynamic language causes the "somDispatch" interface to be overridden and replaced with its own dispatch procedures. The new dispatch procedure searches for a method in the dynamic language class object method table first, and if not found, redirects the message to the SOM environment.

BRIEF DESCRIPTION OF THE DRAWINGS

FIG. 3 is a flow diagram of the procedure for creating a proxy class object and subclass object in a dynamic language.

FIG. 4 is a flow diagram of the procedure for creating a SOM class object.

FIG. 7 is a flow diagram for creating instance variables (class data) in a dynamic language.

FIG. 8 is a flow diagram for creating instances of classes in a dynamic language.

FIG. 9 is a flow diagram for sending messages to the class object in a dynamic language.

DETAILED DESCRIPTION OF THE EMBODIMENTS

Figure 1:
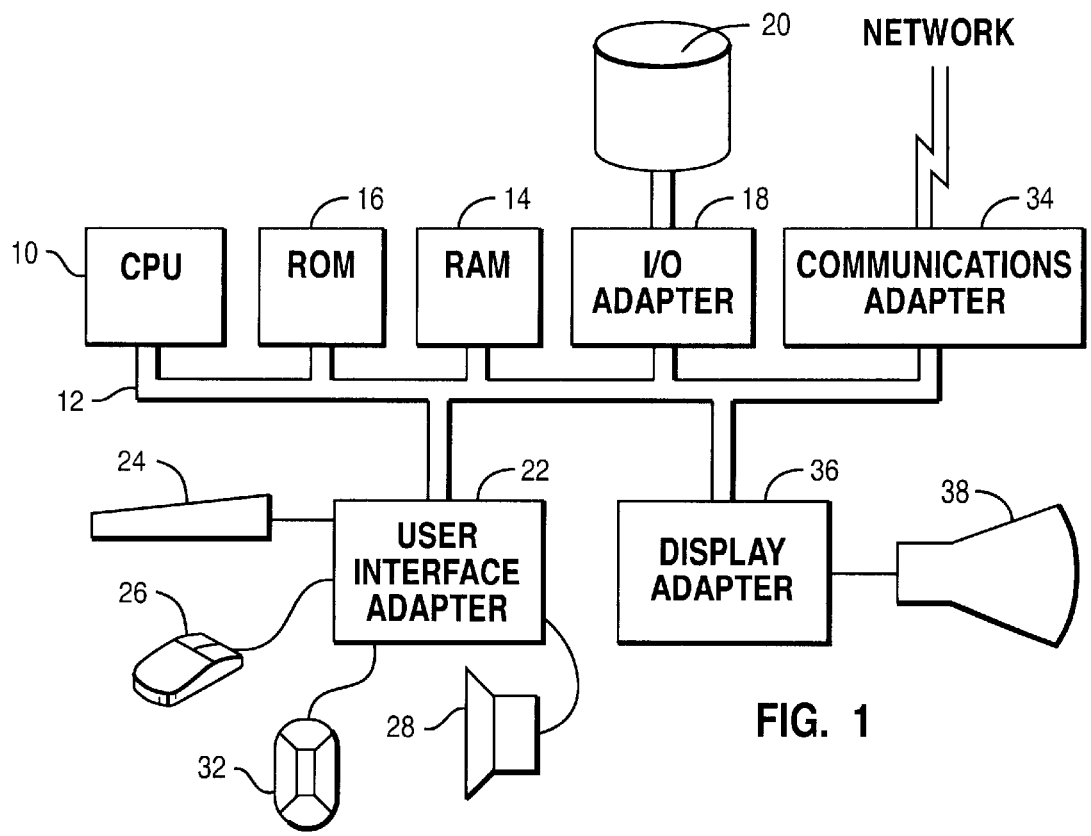
FIG. 1 is a block diagram representation of a computer/workstation where the invention may be practiced.

This invention provides a method and apparatus for subclassing System Object Model (SOM) class objects for an object-oriented dynamic language. Subclassing SOM objects is preferably practiced in the context of an operating system resident on an IBM PS/2 computer available from the IBM Corporation. A representative hardware environment is depicted in FIG. 1, which illustrates a typical hardware configuration of a workstation in accordance with the subject invention, having a central processing unit 10, such as a conventional microprocessor, and a number of other units interconnected via a system bus 12. The workstation shown in FIG. 1, includes a Random Access Memory (RAM) 14, Read Only Memory (ROM) 16, an I/O adapter 18 for connecting peripheral devices such as disk unit 20 to the bus, a user interface adapter 22 for connecting a keyboard 24, a mouse 26, a speaker 28, a microphone 32, and/or other user interface devices such as a touch screen device (not shown) to the bus, a communication adapter 34, for connecting the workstation to a data processing network and a display adapter 36, for connecting the bus to a display device 38. The workstation, in the preferred embodiment, has resident thereon the OS/2 operating system and the computer software making up this invention which is included as a toolkit.

Figure 2:
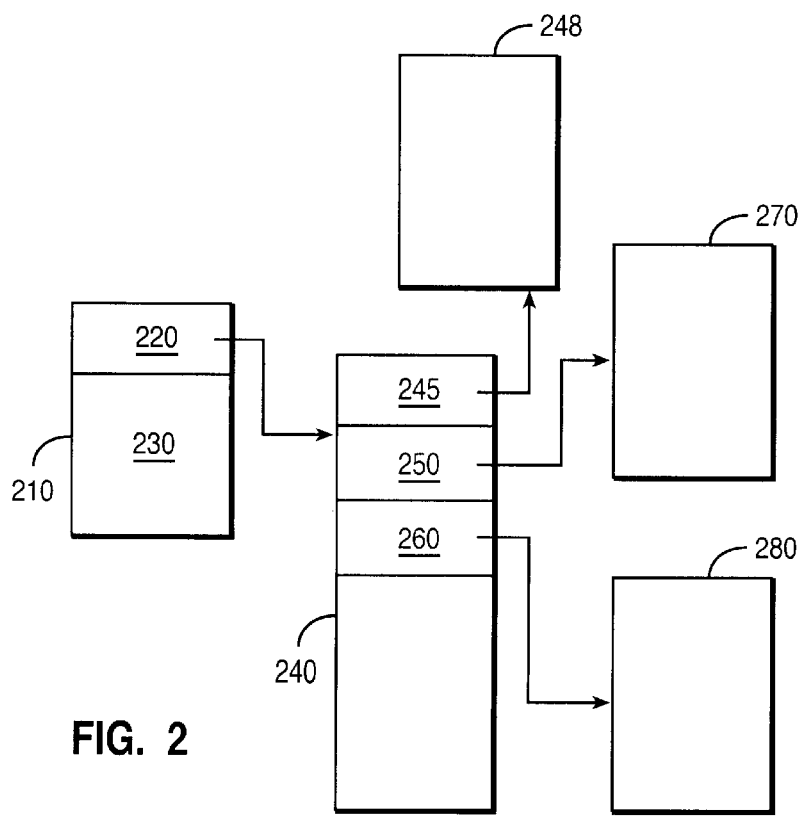
FIG. 2 is a block diagram of the functional blocks of the structure of the IBM System Object Model.

The OS/2 2.x (OS/2 is a trademark and product manufactured by the IBM Corporation) operating system, includes a language-neutral Object-Oriented programming mechanism called the System Object Model (SOM). A basic SOM data structure is shown in FIG. 2. A state data structure 210, for a particular object is shown where the first full word 220, contains the address of the object's method procedure table 240. The method procedure table 240 contains the address of the class object data structure 245, and addresses of various methods for the particular object 250 and 260. The address 245 points to the class object data structure 248. All objects that are of the same class as this object also contain an address that points to this method procedure table 240. Any methods inherited by the objects will have their method procedure addresses at the same offset in memory as they appear in the method procedure table 240, of the ancestor class. Addresses of the blocks of computer memory containing the series of instructions for two of the method procedures are set forth at 250 and 260. Locations 270 and 280, are in computer memory and contain the series of instructions of a particular method procedures pointed to by the addresses at 250 and 260. A complete description of the IBM System Object Model can be found in IBM docket AT9-91-072, Ser. No. 07/805,778, U.S. Pat. No. 5,421,016, entitled "System and Method for Dynamically Invoking Object Methods from an Applicantion Designed for Static Method Invocation", which is incorporated herein by reference.

With reference to FIG. 3, the novel subclass mechanism if this invention will be described for subclassing a SOM class named "Student" in a dynamic object-oriented language class named "Graduate". The procedure starts at block 300, with the creation of a dynamic language proxy class object 310, that points to the "Student" SOM class object. A proxy object is an object which receives messages and forwards them to the object of which it is a proxy, and returns a reply as if the acutal object made the reply. As shown in block 320, the proxy class object contains a stub method for each method of the SOM class. When the stub method is activated as shown in block 340, it calls the "somClassDispatch" mechanism at block 360 to invoke the corresponding SOM method. The stub method searches only those SOM methods defined at or above the "Student" class as shown in block 380. The procedure proceeds to block 390, where a dynamic language subclass "Student" is created for the "Graduate" class. The dynamic language class object as shown in block 400, has a method table which keeps track of the new or overridden methods implemented in the dynamic language. The dynamic language class object also keeps information about the class data.

Turning now to FIG. 4, the procedure continues at 410, and proceeds to block 420, where a SOM class object is created named "Graduate", using the SOM interface. The SOM interface "somCreateDynamicClass", is used to create the class object "Graduate". One skilled in the art will appreciate that the creation of the class object "Graduate", can be done automatically by the dynamic language. When the "Graduate" class is created by the SOM interface, all the method pointers except "somDispatch" and "somClassDispatch", are overridden by the redispatch stubs as shown in block 430. The main purpose of the redispatch stubs is to redirect the control flow to the "somDispatch" interface as shown in block 440. Through the redispatch mechanism, all messages sent to such objects are redirected to the "somDispatch" interface. The dynamic language overrides the "somDispatch" interfaces with its own dispatch procedures as shown in block 450. The new dispatch procedures will first search for the method in the dynamic language class object method table, as shown in block 460. If the method is implemented in the dynamic language, it will be invoked in the dynamic language environment as in block 470. If not, the "somClassDispatch" interface is called to redirect the message to the SOM environment as indicated in block 480.

Figure 5:
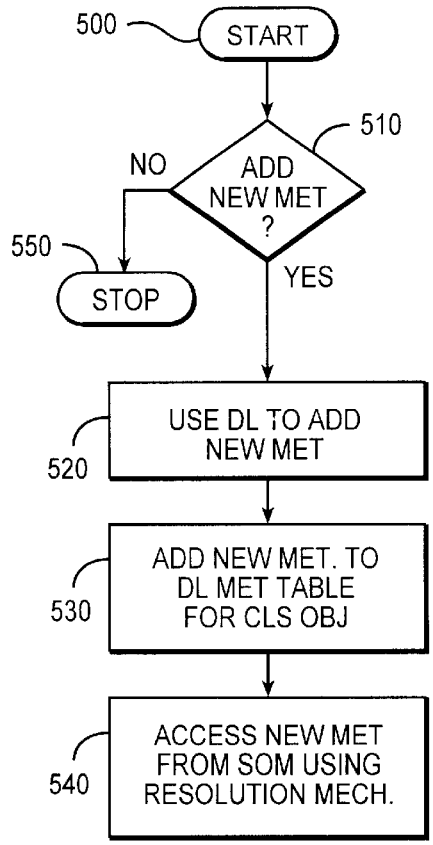
FIG. 5 is a flow diagram for adding new methods using the dynamic language.

Turning now to FIG. 5, a procedure is shown for adding new methods in the dynamic language. The procedure starts at block 500, and proceeds to block 510, where it is determined if a new method is to be added. At block 520, the dynamic language is used to add the new method. The new method is added to the dynamic language method table for the class object as indicated at block 530. The new method is usable from the SOM environment through the dispatch resolution mechanism per block 540.

Figure 6:
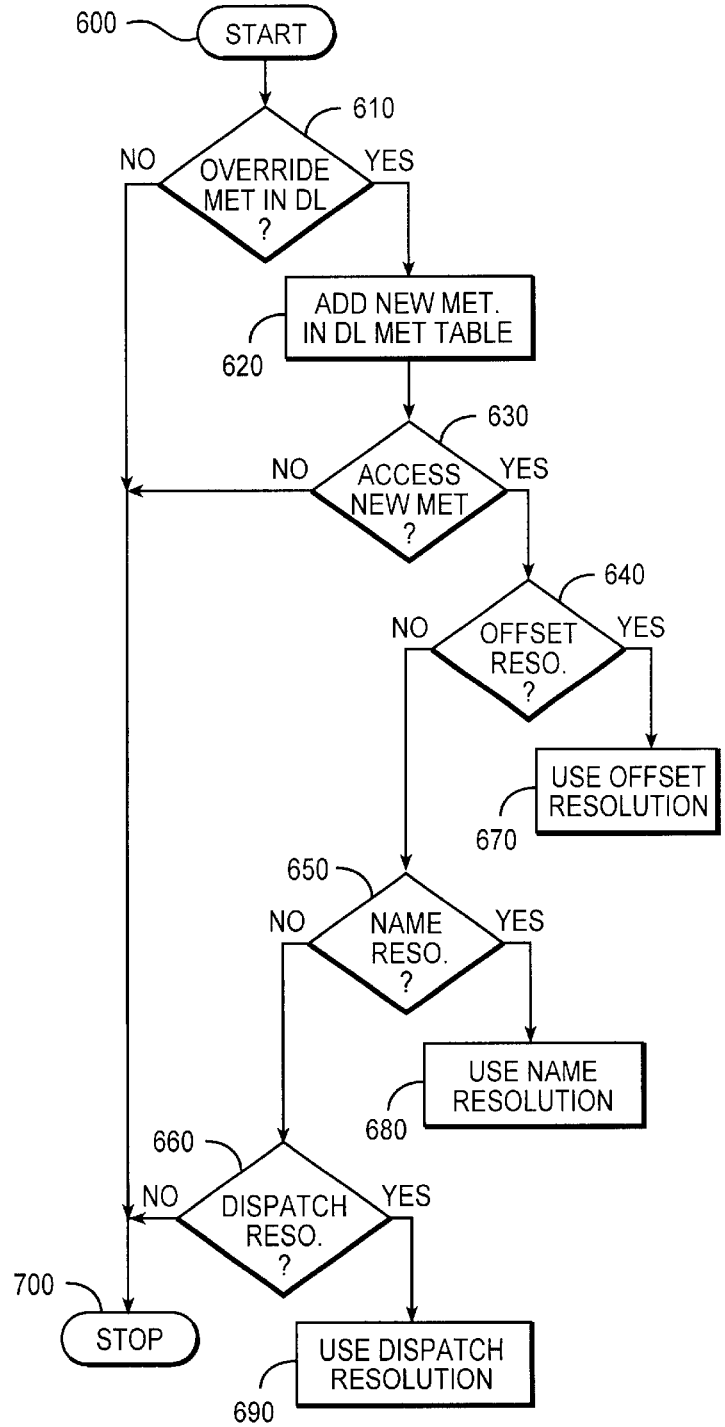
FIG. 6 is a flow diagram for overriding SOM methods using the dynamic language.

Turning to FIG. 6, a procedure is disclosed for overriding methods in the dynamic language. The procedure starts at block 600, and proceeds to block 610, where it is detected if a SOM method is to be overridden. If YES, the procedure allows a new method to be added in the dynamic language method table as shown in block 620. After adding the new method, at block 630, it is determined if it is desired to access the new method. If YES, at block 640, the procedure determines if offset resolution is desired. If YES, at block 670, the offset resolution mechanism is used to access the new method. If NO, at block 650, a check is conducted to determine if name resolution is desired. If YES, the procedure uses the name resolution mechanism to access the new method. If NO, at block 660, the procedure determines. if dispatch resolution is required. If YES, at block 690, the procedure uses the dispatch resolution mechanism to access the new method. If NO, at block 700, the procedure terminates. It will be appreciated that the new method can be used from the SOM environment through any of the resolution mechanisms.

Turning now to FIG. 7, a procedure is shown for creating instance variables (class data). The procedure starts at block 710, and proceeds to block 720, where a check is done to see if the creation of class data is required. If YES, at block 730, the procedure creates the instance variable in the dynamic language environment in the same fashion as an instance variable in pure dynamic language class. If NO, at block 740 the procedure terminates.

Turning to FIG. 8, a technique is described for creating instances of classes. The procedure starts at block 810, where the instance "Graduate" is created. This can be done in either the SOM environment or dynamic language environment. It will be appreciated by those skilled in the art that when creating an instance in a selected environment, a corresponding instance can be automatically created in the non-selected environment. Returning to FIG. 8, if the procedure determines at block 820, that a dynamic language instance is created, at block 840, the dynamic language instance will create a pointer to the SOM environment proxy instance as in block 840. In addition, the dynamic language instance will also carry the dynamic language object data. If at block 830, a SOM instance is created, at block 850, the SOM instance will have a pointer to the dynamic language proxy instance.

Turning now to FIG. 9, the flow diagram is shown for sending messages to the "Graduate" class object. The procedure begins at block 900, and proceeds to block 910, where it is determined if a message is to be sent to the class object "Graduate". If YES, at block 920, it is further determined if the method is defined in the method table. If the method is defined in the method table, at block 930, the method is invoked on the dynamic language side. The dynamic language prepares the method parameters in the form of a variable argument list and passes this to the "somClassDispatch" interface. If the method is not in the method table, at block 940, the procedure determines if the method is to be added. If YES, at block 950, the procedures calls the procedure to add the method. If NO, the procedure ends at block 970.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method, implemented in a computer system, for subclassing system object model objects in an object-oriented dynamic language, comprising:

providing a class object in a system object model environment having a unique name;

creating a proxy class object in said dynamic language having a pointer to said class object in said system object model environment;

creating a subclass in said dynamic language having the unique name of said class object in said system object model environment; and calling a dispatcher from said proxy class object for searching a method for said class object in said system object model environment.

2. The method of claim 1 wherein the step of calling further comprise:

searching said system object model environment for said class object and a plurality of methods at or above said class object.

3. The method of claim 1 wherein the step of creating a proxy class object further comprise:

storing a stub method in said proxy class object for calling a system object model environment dispatcher for searching methods within said system object model.

4. The method of claim 1 wherein the step of creating a proxy class object further comprise:

creating a method table for said proxy class object having new methods for said dynamic language.

5. The method of claim 4 wherein the step of creating a method table further comprises:

storing a method overridden by said dynamic language in said method table.

6. The method of claim 4 wherein the step of creating a proxy class object further comprise:

storing class data in said method table of said proxy class object.

7. An apparatus for subclassing system object model objects in an object-oriented dynamic language, in a data processing system, comprising:

means for providing a class object in a system object model environment having a unique name;

means for creating a proxy class object in said dynamic language having a pointer to said class object in said system object model environment;

means for creating a subclass in said dynamic language having the unique name of said class object in said system object model environment; and means for calling a dispatcher from said proxy class object for searching a method for said class object in said system object model environment.

8. The apparatus of claim 7 wherein the means for calling further comprises:

means for searching said system object model environment for said class object and a plurality of methods at or above said class object.

9. The apparatus of claim 7 wherein the means for creating a proxy class object further comprises:

means for storing a stub method in said proxy class object for calling a system object model environment dispatcher for searching methods within said system object model.

10. The apparatus of claim 7 wherein the means for creating a proxy class object further comprise:

creating a method table for said proxy class object having new methods for said dynamic language.

11. The method of claim 10 wherein the means for creating a method table further comprises:

means for storing a method overridden by said dynamic language in said method table.

12. The method of claim 10 wherein the means for creating a proxy class object further comprise:

means for storing class data in said method table of said proxy class object.

13. A method, implemented in a computer system, for subclassing an object-oriented object created in a first development environment in an object-oriented dynamic language, comprising:

providing a class object in said first development environment having a unique name;

creating a proxy class object in said dynamic language having a pointer to said class object in said first development environment;

creating a subclass in said dynamic language having the unique name of said class object in said first development environment; and calling a dispatcher from said proxy class object for searching a method for said class object in said first development environment.

14. The method of claim 13 wherein the step of calling further comprise:

searching said first development environment for said class object and a plurality of methods at or above said class object.

15. The method of claim 13 wherein the step of creating a proxy class object further comprise:

storing a stub method in said proxy class object in said dynamic language for calling a first development environment dispatcher for searching methods within said first development environment.

16. The method of claim 13 wherein the step of creating a proxy class object further comprise:

creating a method table for said proxy class object having new methods for said dynamic language.

17. The method of claim 16 wherein the step of creating a method table further comprises:

storing a method overridden by said dynamic language in said method table.

18. The method of claim 16 wherein the step of creating a proxy class object further comprise:

storing class data in said method table of said proxy class object.

* * * * *